US012153328B2

(12) United States Patent
Engelen (10) Patent No.: US 12,153,328 B2
(45) Date of Patent: Nov. 26, 2024

(54) COLOR CORRECTION USING MULTIPLE LED ARRAYS

(71) Applicant: Lumileds LLC, San Jose, CA (US)

(72) Inventor: Rob Jacques Paul Engelen, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 163 days.

(21) Appl. No.: 17/991,289

(22) Filed: Nov. 21, 2022

(65) Prior Publication Data

US 2023/0184408 A1 Jun. 15, 2023

Related U.S. Application Data

(60) Provisional application No. 63/288,334, filed on Dec. 10, 2021.

(51) Int. Cl.
*F21V 5/04* (2006.01)
*G03B 15/05* (2021.01)
(Continued)

(52) U.S. Cl.
CPC .............. *G03B 15/05* (2013.01); *F21V 5/04* (2013.01); *F21Y 2105/10* (2016.08);
(Continued)

(58) Field of Classification Search
CPC ........ H05B 45/20; G03B 15/02; G03B 15/03; G03B 15/05; F21V 5/04; F21Y 2105/10; F21Y 2113/10
See application file for complete search history.

(56) References Cited

U.S. PATENT DOCUMENTS

| 6,608,614 | B1 * | 8/2003 | Johnson | ............... | H05B 45/20 |
| | | | | | 362/97.3 |
| 11,892,750 | B2 * | 2/2024 | Pfeffer | ............... | G03B 15/05 |

(Continued)

FOREIGN PATENT DOCUMENTS

| KR | 20120067917 | 6/2012 |
| KR | 20180021467 | 3/2018 |
| WO | 2023107275 | 6/2023 |

OTHER PUBLICATIONS

"International Application Serial No. PCT US2022 050598, International Preliminary Report on Patentability mailed Jun. 20, 2024", 6 pgs.

(Continued)

*Primary Examiner* — Long Nguyen
(74) *Attorney, Agent, or Firm* — Schwegman, Lundberg & Woessner, P.A.

(57) ABSTRACT

An illumination system and method can provide illumination at a specified color point. A first lens can project first light, from a first light-emitting diode (LED) array of first LEDs, corresponding to a specified illumination pattern and having a first color point, onto a scene to form first illumination regions at the scene that correspond to the first LEDs. A second lens can project second light, from a second LED array of second LEDs, having a second color point, onto the scene to form second illumination regions at the scene that at least partially overlap with corresponding first illumination regions at the scene. The first illumination can combine with the second illumination at the scene to form combined illumination that corresponds to the specified illumination pattern. The combined illumination can have a specified color point, such as between the first color point and the second color point.

19 Claims, 3 Drawing Sheets

(51) Int. Cl.
    *F21Y 105/10*         (2016.01)
    *F21Y 113/10*         (2016.01)
    *F21Y 115/10*         (2016.01)
    *G03B 15/02*         (2021.01)

(52) U.S. Cl.
    CPC ........ *F21Y 2113/10* (2016.08); *F21Y 2115/10* (2016.08); *G03B 15/02* (2013.01)

(56) References Cited

U.S. PATENT DOCUMENTS

2009/0323305 A1    12/2009    Deng
2012/0190136 A1    7/2012    Hong

OTHER PUBLICATIONS

"International Application Serial No. PCT/US2022/050598, International Search Report mailed Apr. 24, 2023", 4 pgs.
"International Application Serial No. PCT/US2022/050598, Written Opinion mailed Apr. 24, 2023", 4 pgs.

* cited by examiner

COLOR CORRECTION USING MULTIPLE LED ARRAYS

CROSS-REFERENCE TO RELATED APPLICATION

This application claims the benefit of U.S. Provisional Application No. 63/288,334, filed on Dec. 10, 2021, the entirety of which is hereby incorporated by reference herein.

FIELD OF THE DISCLOSURE

The present disclosure relates to an illumination system, such as for a camera.

BACKGROUND OF THE DISCLOSURE

An illumination system can provide illumination. For example, a camera flash can illuminate a scene. There is ongoing effort to improve illumination systems, such as for cameras.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Some illumination systems, such as for a camera flash or for vehicle headlights, can vary a light intensity over an illumination field. For example, a camera flash can direct more light to objects in a scene that are relatively far from the camera, and less light to objects in the scene that are relatively close to the camera, so that both the far objects and the near objects can have suitable lighting for a captured image of the scene. As another example, vehicle headlights can dim a portion of the angular illumination field to avoid blinding drivers of oncoming vehicles. Other suitable examples and applications can also be used.

In some examples of illumination systems that can vary a light intensity over an illumination field, a lens can collimate (or at least partially focus) light from a light-emitting diode (LED) array, such as a segmented LED that has individually addressable segments that can be electrically powered independent of other segments. For the purposes of this document, the terms "LED array" and "segmented LED" are interchangeable, and the terms "LEDs" and "LED segments" are interchangeable.

The lens can direct light toward the scene, such that a particular location on the LED array can be directed in a particular angular orientation toward the scene. By varying electrical power sent to the LEDs of the LED array, the illumination system can dynamically adjust the light intensity over the illumination field. For illumination of a particular scene, the light propagating in a particular direction can correspond to a particular location in the scene. In other words, to dynamically adjust illumination intensities for locations within the scene, the illumination system can dynamically adjust electrical power sent to the various LEDs in the LED array.

One potential drawback to using an LED array to vary illumination intensities for locations within the scene is that it can be difficult to maintain a uniform color over LEDs that are powered with different amounts of current. For example, in an array of white-light LEDs, for which each LED has an LED die that produces excitation light and a phosphor that absorbs at least some of the excitation light and produces phosphor light, the combined excitation light and phosphor light that is emitted from the LED can have a nominal (e.g., specified) color. It is found that phosphor for a particular LED can spuriously absorb excitation light that is produced by an adjacent LED and can therefore emit more phosphor light than the nominal (e.g., specified) amount of phosphor light. Such additional phosphor light can discolor the total amount of light produced by the LED. For excitation light that is blue or violet, and phosphor light that is yellow, the discoloration can appear in the scene as yellow-colored halos surrounding relatively bright illumination areas in the scene.

To solve the problem of discoloration, an illumination system can include multiple LED arrays, each producing light corresponding to a specified illumination pattern, but with different colors. For example, to solve the problem of phosphors absorbing excitation light from adjacent LEDs and thereby producing too much phosphor light, an illumination system can include an additional LED array that produces excitation light but lacks a phosphor. To compensate for the additional phosphor light, the illumination system can direct a compensating amount of excitation light toward the appropriate locations in the scene. This is but one example of use of multiple LED arrays with different colors. Other examples are described below in detail.

In this document, the term "color point" can include a two-dimensional location on a chromaticity diagram. The two-dimensional location can represent a specific color, such a specific spectral profile, of light or combinations of light. In some examples, single-wavelength light can extend around a portion of a perimeter of the diagram. In a specific example of a chromaticity diagram, violet light can be located near a bottom-left corner of the chromaticity diagram, green light can be located near a top-left corner of the chromaticity diagram, and red light can be located near a bottom-right corner of the chromaticity diagram. Other two-dimensional chromaticity diagrams can also be used. In some examples, light emitted from a phosphor-free LED, or excitation light in a white-light LED, which can have a relatively narrow spectrum compared to its wavelength, can be located on or near the perimeter of the chromaticity diagram. In some examples, combinations of single-wavelength light can occupy interior locations of the chromaticity diagram. In some examples, phosphor light, such as light absorbed and then reemitted by a phosphor in a white-light LED, can have a relatively wide spectrum compared to its wavelength, and can be located in an interior of the chromaticity diagram. For light having a two-dimensional location that is relatively close to a blackbody curve, such as white light, the term "color temperature" can apply. For white-light LEDs, the term "color point" can optionally include a color temperature. For example, white light can be described as cool white, warm white, or another designation along the blackbody curve. The term "color point" is used consistently in the remainder of this document. It will be understood that "color point" can mean "color temperature" for white light, such as output light in a phosphor-based white-light LED. It will also be understood that "color point" can represent a two-dimensional location in a chromaticity diagram for colors that can reside relatively far from the blackbody curve, such as non-white light, such as excitation light in a phosphor-based white-light LED.

In an example, an illumination system and method can provide illumination at a specified color point. A first lens can project first light, from a first LED array of first LEDs, corresponding to a specified illumination pattern and having a first color point, onto a scene to form first illumination regions at the scene that correspond to the first LEDs. A second lens can project second light, from a second LED array of second LEDs, having a second color point, onto the scene to form second illumination regions at the scene that at least partially overlap with corresponding first illumination regions at the scene. The first illumination can combine with the second illumination at the scene to form combined illumination that corresponds to the specified illumination pattern. The combined illumination can have a specified color point, such as between the first color point and the second color point. An optional third LED array and third lens can direct third illumination at a third color point toward the scene, to afford additional flexibility in obtaining the specified color point at the scene.

Figure 1:
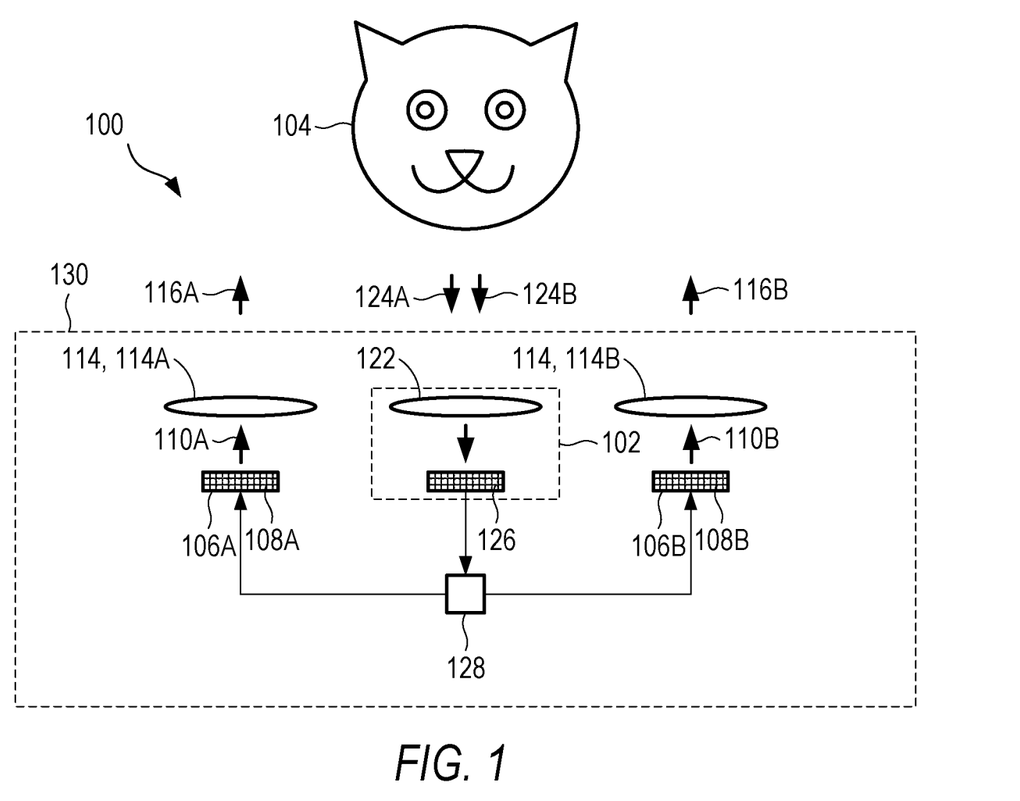
FIG. 1 shows a side view of an example of an illumination system, in accordance with some examples.

FIG. 1 shows a side view of an example of an illumination system 100, such as for a camera 102, in accordance with some examples. The camera 102 can capture an image of a scene 104 during an exposure duration of the camera 102. In FIG. 1, the scene 104 is shown as being a happy cat; other suitable scenes can also be used.

The illumination system 100 can include a first LED array 106A. The first LED array 106A can include first LEDs 108A that can produce first light 110A. The first light 110A can correspond to a specified illumination pattern and can have a first color point. In some examples, the specified illumination pattern can include uniform illumination. In some examples, the specified illumination pattern can include nonuniform illumination, where one region of the scene 104 is to receive more illumination than another region of the scene 104. In some examples, the first LED array 106A can include a segmented LED, with the first LEDs 108A including individually addressable (e.g., individually controllable or individually powerable) LED segments.

Figure 2:
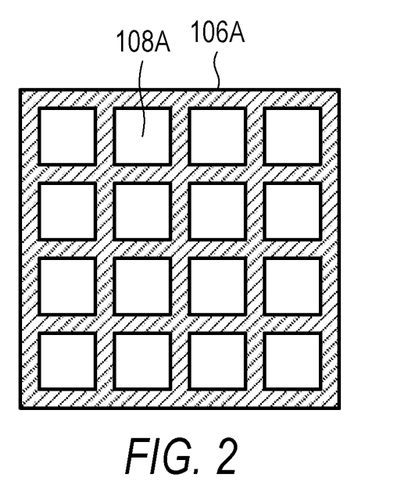
FIG. 2 shows a front view of an example of an LED array, in accordance with some examples.

FIG. 2 shows a front view of an example of a first LED array 106A of FIG. 1, in accordance with some examples. In the example of FIG. 2, the LED array 106A can include first LEDs 108A arranged in a rectilinear grid. Other suitable arrangements can also be used.

Returning to FIG. 1, the illumination system 100 can include at least one lens 114, such as a first lens 114A. The at least one lens 114, such as the first lens 114A, can project the first light 110A onto the scene 104 as first illumination 116A. In some examples, the first LED array 106A can be located at a focal plane of the at least one lens 114, such as the first lens 114A. In some examples, the at least one lens 114, such as the first lens 114A, can collimate the first light 110A to form the first illumination 116A. The first illumination 116A can form first illumination regions at the scene 104 that correspond to the first LEDs 108A.

Figure 3:
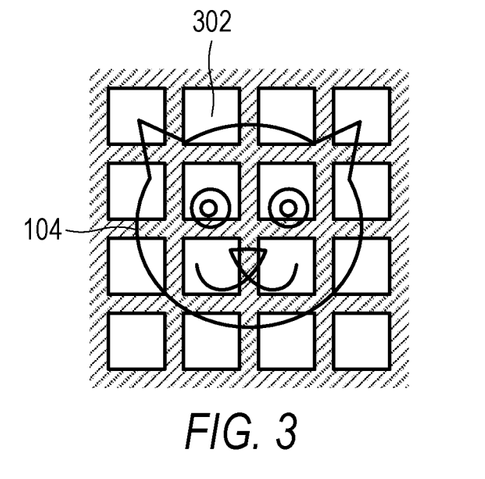
FIG. 3 shows a front view of an example of combined illumination at the scene, in accordance with some examples.

FIG. 3 shows a front view of an example of first illumination regions 302 at the scene 104, in accordance with some examples. Because the first lens 114A can collimate the first light 110A, such as by locating the first LED array 106A at a focal plane of the first lens 114A, features in translational space on the first LED array 106A can correspond to features in angular space in the first illumination 116A. For example, bright and dark areas of the first LED array 106A can correspond to bright and dark regions in angular space emerging from the illumination system 100. Because the scene 104 can be relatively far from the illumination system 100, compared with distance and sizes of the elements in the illumination system 100, the bright and dark regions in angular space can correspond to bright and dark areas in the illumination pattern that the illumination system projects onto the scene 104.

Returning to FIG. 1, the illumination system 100 can include a second LED array 106B. The second LED array 106B can include second LEDs 108B that can produce second light 110B. In some examples, the second LEDs 108B can correspond to the first LEDs 108A in a one-to-one correspondence. The second light 110B can have a second color point different from the first color point. The second LEDs 108B can be arranged similarly to the arrangement of the first LEDs 108A, such as the grid shown in FIG. 2.

The illumination system 100 can include a second lens 114B. The at least one lens 114, such as the second lens 114B, can project the second light 110B onto the scene 104 as second illumination 116B. In some examples, the at least one lens 114, such as the second lens 114B, can collimate the second light 110B to form the second illumination 116B. The second illumination 116B can form second illumination regions at the scene 104 that correspond to the second LEDs 108B. The second illumination regions can be arranged in a pattern similar to or matching the arrangement of the first illumination regions, such as the first illumination regions 302 shown in FIG. 3. Each second illumination region can at least partially overlap with a corresponding first illumination region at the scene 104. The first illumination 116A can combine with the second illumination 116B at the scene 104 to form combined illumination that corresponds to the specified illumination pattern. The combined illumination can have a specified color point, such as between the first color point and the second color point.

In some examples, the first lens 114A can define a first central axis extending from the first LED array 106A through a center of the first lens 114A. The second lens 114B can define a second central axis extending from the second LED array 106B through a center of the second lens 114B. In some examples, the first central axis can be parallel to the second central axis. In some examples, the first LED array 106A can be located at a focal plane of the first lens 114A. In some examples, the second LED array 106B can be located at a focal plane of the second lens 114B.

Because the second lens 114B can collimate the second light 110B, such as by locating the second LED array 106B at a focal plane of the second lens 114B, features in translational space on the second LED array 106B can correspond to features in angular space in the second illumination 116B. Because the scene 104 can be relatively far from the illumination system 100, compared with distance and sizes of the elements in the illumination system 100, the bright and dark regions in angular space can correspond to bright and dark areas in the illumination pattern that the illumination system projects onto the scene 104.

Further, because a distance to the scene 104 can be significantly greater than a spacing between the first lens 114A and the second lens 114B, the spacing between the first lens 114A and the second lens 114B can be neglected when determining where a particular ray at a particular propagation angle will strike the scene 104. As a result, it can be assumed that a first ray propagating at a specified propagation angle in the first illumination 116A and a second ray propagating at the specified propagation angle in the second illumination 116B can arrive at the same location in the scene 104.

Figure 4:
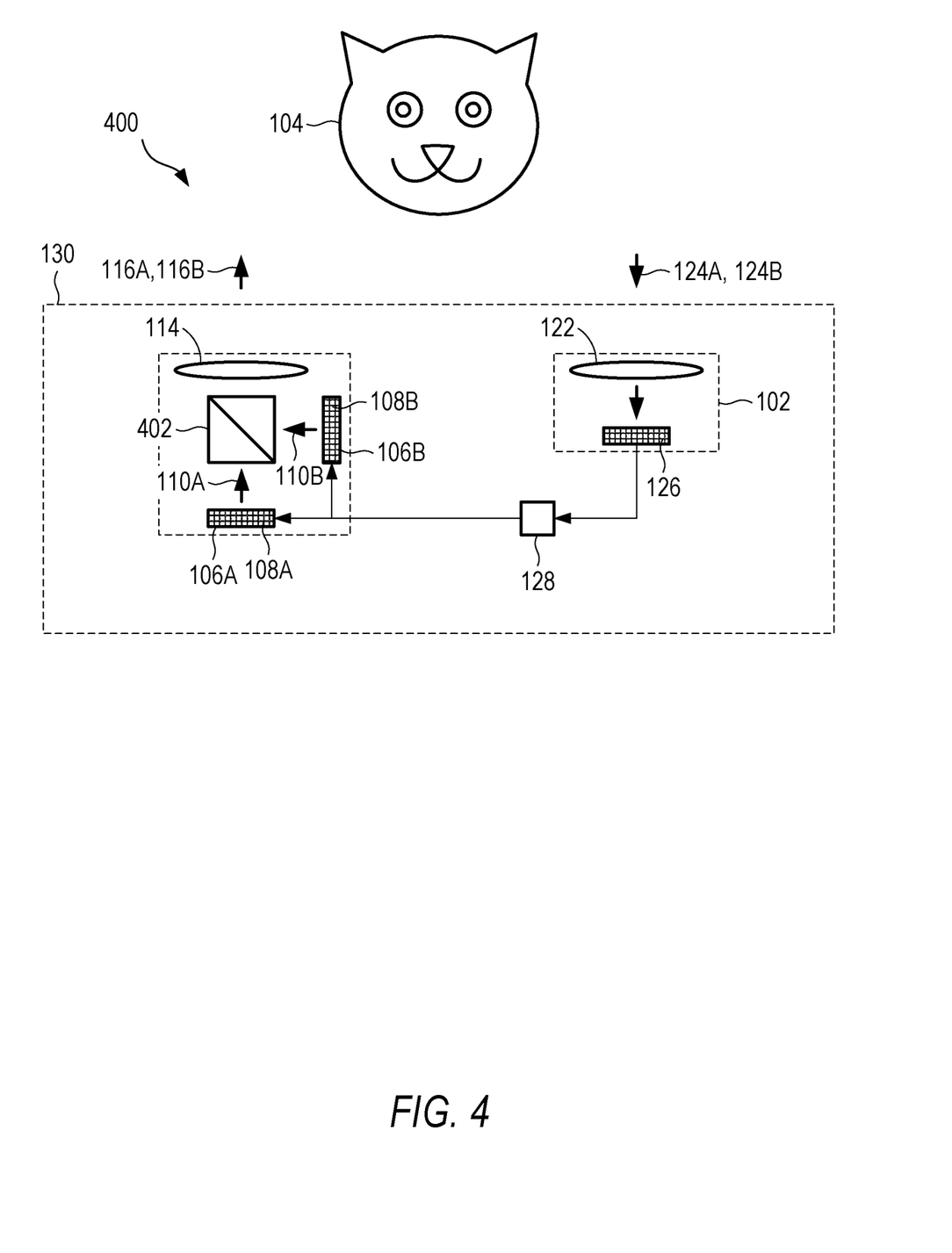
FIG. 4 shows a side view of an example of an illumination system, in accordance with some examples.

While the configuration of FIG. 1 includes multiple lenses, it is possible to configure the illumination system to include only a single lens. For example, FIG. 4 shows a side view of an example of an illumination system 400, such as for a camera 102, in accordance with some examples. Compared with the illumination system 100 of FIG. 1, the illumination system 400 uses a single lens 114 to replace the first lens 114A and the second lens 114B and includes an additional beamsplitter 402 to combine the first light 110A with the second light 110B and direct the combined first light 110A and second light 110B to the lens 114. The beamsplitter 402 can be formed as a cube beamsplitter having a beamsplitting coating disposed on a hypotenuse of the cube. The beamsplitter 402 can alternatively be formed as a plate beamsplitter, a polygonal prism, or other suitable beamsplitting geometry.

Returning to FIG. 1, in some examples, the illumination system 100 can optionally further include a controller 128. The controller 128 can receive a specified illumination pattern. The controller 128 can electrically power the first LED array 106A in response to the specified illumination pattern such that the first illumination 116A corresponds to the specified illumination pattern. The controller 128 can electrically power the second LED array 106B in response to the specified illumination pattern such that the second illumination 116B corresponds to the specified illumination pattern.

In some examples, the illumination system 100 can optionally further include a housing 130. The first LED array 106A and the second LED array 106B can be disposed in the housing 130. The first lens 114A and the second lens 114B can be disposed in or on the housing 130. The first lens 114A and the second lens 114B can direct the first illumination 116A and the second illumination 116B, respectively, away from the housing 130.

In some examples, the illumination system 100 can optionally further include a camera 102 disposed in or on the housing 130. The camera 102 can collect first illumination 124A that is reflected from the scene 104 and second illumination 124B that is reflected from the scene 104. The camera 102 can include a lens 122 to form an image of the scene 104 from the collected light. A multi-pixel sensor 126 in the camera 102 can sense the image. The controller 128 can receive a signal from the multi-pixel sensor 126 to generate a digital data signal that represents the image of the scene 104.

In some examples, the camera 102 can be located between the first lens 114A and the second lens 114B.

Three configurations are described below, which provide detail as to how light from multiple LED arrays is combined to affect color point at the scene 104. In a first configuration, the illumination system 100 can adjust color point by combining the light from a phosphor-based white-light LED array with a phosphor-free LED array that adds additional excitation light at the scene. In a second configuration, the illumination system 100 can adjust color point by using combining the light from two LED arrays with different amounts of the same phosphor material. In a third configuration, the illumination system 100 can adjust color point by combining the light from two (or more) LED arrays with different phosphor materials.

In the first configuration, the illumination system 100 can adjust color point by combining the light from a phosphor-based white-light LED array with a phosphor-free LED array that adds additional excitation light at the scene. For example, each first LED 108A can include a first die that can produce first excitation light. Each first LED 108A can include a first phosphor that can absorb at least some of the first excitation light and, in response, produce first phosphor light. The first phosphor can further absorb at least some first excitation light from adjacent first LEDs 108A in the first LED array 106A and, in response, produce spurious phosphor light, such that the first light 110A is a combination of at least some of the first excitation light and at least some of the first phosphor light and at least some of the spurious phosphor light. Each second LED 108B can include a second die that can produce second excitation light. Each second LED 108B can lack a phosphor, such that the second light 110B includes only the second excitation light.

In some examples of the first configuration, a combination of the first excitation light and the first phosphor light can have the specified color point. A combination of the first excitation light and the first phosphor light and the spurious phosphor light can have a discolored color point. A combination of the first excitation light and the first phosphor light and the spurious phosphor light and the second light 110B can have a color-corrected color point. A difference between the color-corrected color point and the specified color point can be less than a difference between the discolored color point and the specified color point.

In some examples of the first configuration, the first excitation light and the second excitation light can have a same wavelength. For example, the wavelength can be between 445 nm and 455 nm, which is in the blue portion of the electromagnetic spectrum. Other suitable wavelengths can also be used.

In some examples of the first configuration, the controller 128 can receive the specified illumination pattern. The controller 128 can cause the first LED array 106A to be electrically powered in a first illumination pattern that corresponds to the specified illumination pattern. The controller 128 can cause the second LED array 106B to be electrically powered in a second illumination pattern that at least partially compensates for the spurious phosphor light, such that a combination of the spurious phosphor light and the second light 110B has the specified color point.

In some examples of the first configuration, the second illumination pattern can specify that in response to powering of a specified first LED, the second LEDs 108B corresponding to first LEDs 108A that are adjacent to the specified first LED can produce second light 110B. In some examples, the second illumination pattern can specify that in response to powering of a specified first LED, the second LED corresponding to the specified first LED may not produce second light 110B.

In a specific example of the first configuration, the illumination system 100 can include an array of first LEDs 108A. Each first LED 108A can emit excitation light when powered. Each first LED 108A can include a phosphor that can absorb at least some of the excitation light and, in response, produce phosphor light. A combination of the excitation light and the phosphor light can form specified light that has a specified color point. The phosphor of each first LED 108A can further produce spurious phosphor light in response to leaked excitation light from adjacent first LEDs 108A in the array of first LEDs 108A. A combination of the excitation light and the phosphor light and the spurious phosphor light can form discolored light having a discolored color point that differs from the specified color point. The illumination system 100 can include at least one lens 114 that can collimate the discolored light to form discolored illumination and illuminate the scene 104 with the discolored illumination. The first LEDs 108A can form corresponding first illumination regions in the discolored illumination at the scene 104. The illumination system 100 can include an array of second LEDs 108B having a one-to-one correspondence with the array of first LEDs 108A. The second LEDs 108B can emit color-correction light having a color-correction color point that differs from the specified color point. The at least one lens 114 can collimate the color-correction light to form color-correction illumination and illuminate the scene 104 with the color-correction illumination. The second LEDs 108B can form corresponding second illumination regions in the color-correction illumination at the scene 104. Each second illumination region can at least partially overlap with a corresponding first illumination region at the scene 104. The discolored illumination can combine with the color-correction illumination to form corrected illumination at the scene 104. The corrected illumination can have a corrected color point. A difference between the corrected color point and the specified color point can be less than a difference between the discolored color point and the specified color point.

In the second configuration, the illumination system 100 can adjust color point by using combining the light from two LED arrays with different amounts of the same phosphor material. For example, each first LED 108A can include a first die that can produce first excitation light. Each first LED 108A can include a first amount of a first phosphor that can absorb at least some of the first excitation light and, in response, produce first phosphor light. Each second LED 108B can include a second die that can produce second excitation light. Each second LED 108B can include a second amount, different from the first amount, of the first phosphor that can absorb at least some of the second excitation light and, in response, produce second phosphor light.

In some examples of the second configuration, the first excitation light and the second excitation light can have a same wavelength. The first phosphor light and the second phosphor light can have a same color point. Different amounts of the first phosphor can cause the first light 110A and the second light 110B to have different color points.

In some examples of the second configuration, the controller 128 can receive the specified illumination pattern. The controller 128 can receive the specified color point. The controller 128 can determine a first set of intensities and a second set of intensities in response to the specified color point. The first set of intensities and the second set of intensities can represent relative amounts of light at the first color point and the second color point, respectively. The controller 128 can cause the first LED array 106A to be electrically powered, with the first set of intensities, in a first illumination pattern that corresponds to the specified illumination pattern. The controller 128 can cause the second LED array 106B to be electrically powered, with the second set of intensities, in a second illumination pattern that corresponds to the specified illumination pattern.

In the third configuration, the illumination system 100 can adjust color point by combining the light from two (or more) LED arrays with different phosphor materials. For example, each first LED can include a first die that can produce first excitation light. Each first LED can include a first phosphor, formed from a first phosphor material, that can absorb at least some of the first excitation light and, in response, produce first phosphor light. Each second LED can include a second die that can produce second excitation light. Each second LED can include a second phosphor, formed from a second phosphor material different from the first phosphor material, that can absorb at least some of the second excitation light and, in response, produce second phosphor light.

In some examples of the third configuration, the first excitation light and the second excitation light can have the same wavelength. Different phosphor materials can cause the first phosphor light and the second phosphor light to have different color points.

In some examples of the third configuration, the controller 128 can receive the specified illumination pattern. The controller 128 can receive the specified color point. The controller 128 can determine a first set of intensities and a second set of intensities in response to the specified color point. The first set of intensities and the second set of intensities can represent relative amounts of light at the first color point and the second color point, respectively. The controller 128 can cause the first LED array 106A to be electrically powered, with the first set of intensities, in a first illumination pattern that corresponds to the specified illumination pattern. The controller 128 can cause the second LED array 106B to be electrically powered, with the second set of intensities, in a second illumination pattern that corresponds to the specified illumination pattern.

In some examples of the third configuration, the illumination system 100 can further include a third LED array and a third lens. The third LED can produce light having a third color point different from the first and second color points. In some examples, the three color points can correspond to points of a triangle on a chromaticity diagram, such that a combination of the three lights can have a color point within the area of the triangle. In some examples, the three color points can correspond to red-tinged white light green-tinged white light, and blue-tinged white light. Other color points can also be used.

In a specific example of the third configuration, the illumination system 100 can further include a third LED array including third LEDs that can produce third light. The third light can correspond to a specified illumination pattern. The third light can have a third color point different from the first color point and different from the second color point. The illumination system 100 can further include a third lens that can project the third light onto the scene 104 as third illumination. The third illumination can form third illumination regions at the scene 104 that correspond to the third LEDs. Each third illumination region can at least partially overlap with a corresponding first illumination region at the scene 104 and at least partially overlap with a corresponding second illumination region at the scene 104. The third illumination can combine with the first illumination 116A and the second illumination 116B at the scene 104 to form the combined illumination that corresponds to the specified illumination pattern. The combined illumination can have the specified color point.

In a specific example of the third configuration, the illumination system 100 can further include the controller 128. The controller 128 can receive the specified illumination pattern. The controller 128 can receive the specified color point. The controller 128 can determine a first set of intensities, a second set of intensities, and a third set of intensities in response to the specified color point. The first set of intensities, the second set of intensities, and the third set of intensities can represent relative amounts of light at the first color point, the second color point, and the third color point, respectively. The controller 128 can cause the first LED array 106A to be electrically powered, with the first set of intensities, in a first illumination pattern that corresponds to the specified illumination pattern. The controller 128 can cause the second LED array 106B to be electrically powered, with the second set of intensities, in a second illumination pattern that corresponds to the specified illumination pattern. The controller 128 can cause the third LED array to be electrically powered, with the third set of intensities, in a third illumination pattern that corresponds to the specified illumination pattern.

Figure 5:
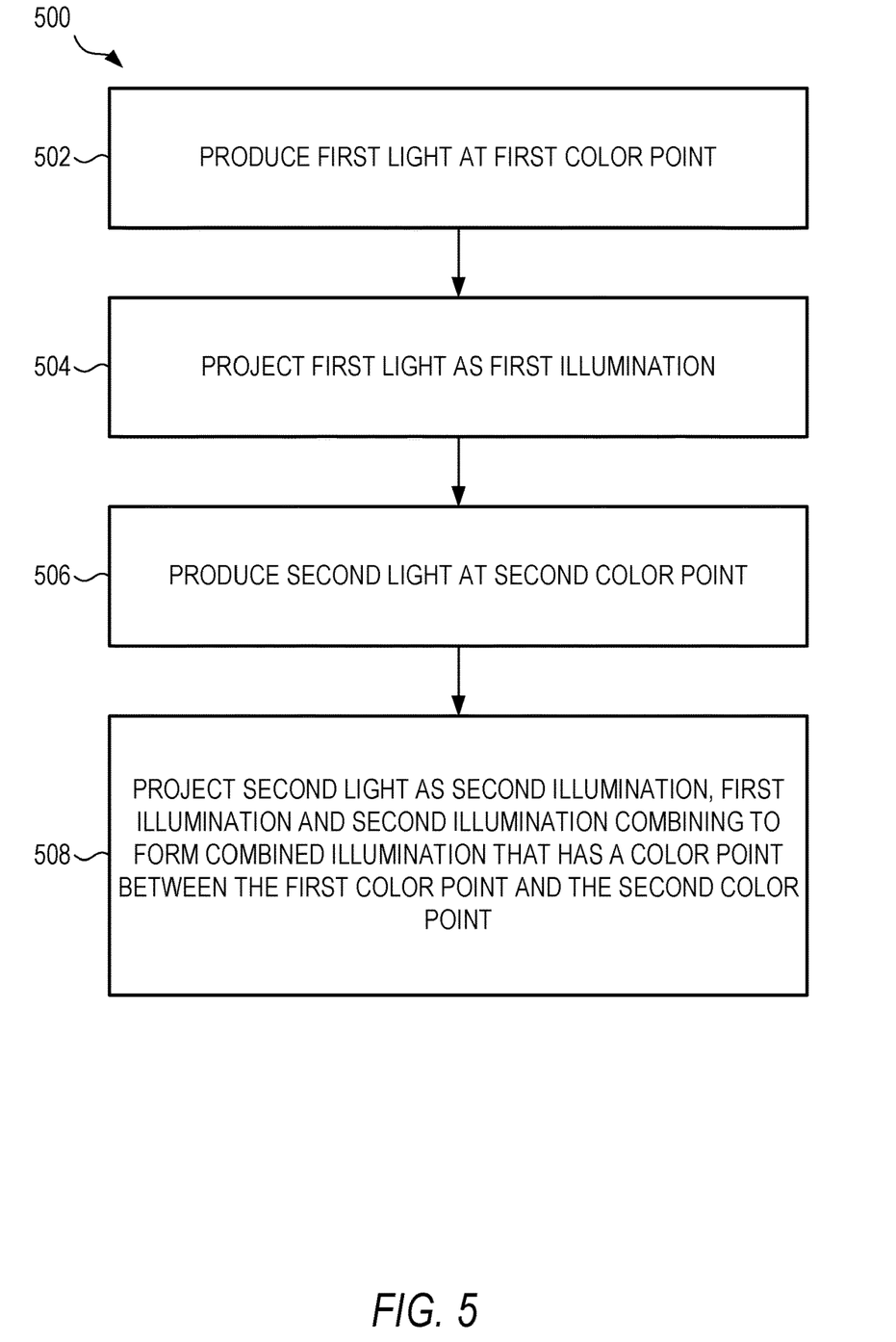
FIG. 5 shows a flowchart of an example of a method for providing illumination, in accordance with some examples.

FIG. 5 shows a flowchart of an example of a method 500 for providing illumination, in accordance with some examples. The method 500 can be executed by illumination system 100, illumination system 400, or another suitable system. The method 500 for providing illumination is but one method for providing illumination; other suitable methods can also be used.

At operation 502, a first light-emitting diode (LED) array including first LEDs can produce first light that corresponds to a specified illumination pattern and has a first color point.

At operation 504, a first lens can project the first light onto a scene as first illumination. The first illumination can form first illumination regions at the scene that correspond to the first LEDs.

At operation 506, a second LED array including second LEDs can produce second light that has a second color point different from the first color point.

At operation 508, a second lens 114B can project the second light onto the scene as second illumination. The second illumination can form second illumination regions at the scene that correspond to the second LEDs. Each second illumination region can at least partially overlap with a corresponding first illumination region at the scene. The first illumination can combine with the second illumination at the scene to form combined illumination that corresponds to the specified illumination pattern. The combined illumination can have a specified color point between the first color point and the second color point.

In some examples, such as examples corresponding to the first configuration described above, each first LED can include a first die that can produce first excitation light. Each first LED can include a first phosphor that can absorb at least some of the first excitation light and, in response, produce first phosphor light. The first phosphor can further absorb at least some first excitation light from adjacent first LEDs in the first LED array and, in response, produce spurious phosphor light, such that the first light is a combination of at least some of the first excitation light and at least some of the first phosphor light and at least some of the spurious phosphor light. Each second LED can include a second die that can produce second excitation light, the second excitation light and the first excitation light having a same wavelength. Each second LED can lack a phosphor, such that the second light includes only the second excitation light. A combination of the first excitation light and the first phosphor light can have a specified color point. A combination of the first excitation light and the first phosphor light and the spurious phosphor light can have a discolored color point. A combination of the first excitation light and the first phosphor light and the spurious phosphor light and the second light can have a color-corrected color point. A difference between the color-corrected color point and the specified color point can be less than a difference between the discolored color point and the specified color point.

In some examples, such as examples corresponding to the second configuration described above, each first LED can include a first die that can produce first excitation light. Each first LED can include a first amount of a first phosphor that can absorb at least some of the first excitation light and, in response, produce first phosphor light. Each second LED can include a second die that can produce second excitation light. The second excitation light and the first excitation light can have a same wavelength. Each second LED can include a second amount, different from the first amount, of the first phosphor that can absorb at least some of the second excitation light and, in response, produce second phosphor light. The second phosphor light and the first phosphor light can have a same color point. Different amounts of the first phosphor can cause the first light and the second light to have different color points.

In some examples, such as examples corresponding to the third configuration described above, each first LED can include a first die that can produce first excitation light. Each first LED can include a first phosphor, formed from a first phosphor material, that can absorb at least some of the first excitation light and, in response, produce first phosphor light. Each second LED can include a second die that can produce second excitation light. The second excitation light and the first excitation light can have a same wavelength. Each second LED can include a second phosphor, formed from a second phosphor material different from the first phosphor material, that can absorb at least some of the second excitation light and, in response, produce second phosphor light. Different phosphor materials can cause the first phosphor light and the second phosphor light to have different color points.

The system and method are applicable to adaptive flash for mobile devices, steerable illumination for automotive/industry applications, and others.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system can include: a first light-emitting diode (LED) array including first LEDs that are configured to produce first light, the first light corresponding to a specified illumination pattern and having a first color point; a first lens configured to project the first light onto a scene as first illumination, the first illumination forming first illumination regions at the scene that correspond to the first LEDs; a second LED array including second LEDs that are configured to produce second light, the second light having a second color point different from the first color point; and a second lens configured to project the second light onto the scene as second illumination, the second illumination forming second illumination regions at the scene that correspond to the second LEDs, each second illumination region at least partially overlapping with a corresponding first illumination region at the scene, the first illumination combining with the second illumination at the scene to form combined illumination that corresponds to the specified illumination pattern, the combined illumination having a specified color point between the first color point and the second color point.

In Example 2, the illumination system of Example 1 can optionally be configured such that: the first lens defines a first central axis extending from the first LED array through a center of the first lens; the second lens defines a second central axis extending from the second LED array through a center of the second lens; the first central axis is parallel to the second central axis; the first LED array is located at a focal plane of the first lens; and the second LED array is located at a focal plane of the second lens.

In Example 3, the illumination system of any one of Examples 1-2 can optionally be configured such that: each first LED includes a first die configured to produce first excitation light; each first LED includes a first phosphor configured to absorb at least some of the first excitation light and, in response, produce first phosphor light; the first phosphor is further configured to absorb at least some first excitation light from adjacent first LEDs in the first LED array and, in response, produce spurious phosphor light, such that the first light is a combination of at least some of the first excitation light and at least some of the first phosphor light and at least some of the spurious phosphor light; each second LED includes a second die configured to produce second excitation light; and each second LED lacks a phosphor, such that the second light includes only the second excitation light.

In Example 4, the illumination system of any one of Examples 1-3 can optionally be configured such that: a combination of the first excitation light and the first phosphor light has a specified color point; a combination of the first excitation light and the first phosphor light and the spurious phosphor light has a discolored color point; a combination of the first excitation light and the first phosphor light and the spurious phosphor light and the second light has a color-corrected color point; and a difference between the color-corrected color point and the specified color point is less than a difference between the discolored color point and the specified color point.

In Example 5, the illumination system of any one of Examples 1-4 can optionally be configured such that the first excitation light and the second excitation light have a same wavelength.

In Example 6, the illumination system of any one of Examples 1-5 can optionally be configured such that the illumination system further comprises a controller configured to: receive the specified illumination pattern; cause the first LED array to be electrically powered in a first illumination pattern that corresponds to the specified illumination pattern; and cause the second LED array to be electrically powered in a second illumination pattern that at least partially compensates for the spurious phosphor light, such that a combination of the spurious phosphor light and the second light has the specified color point.

In Example 7, the illumination system of any one of Examples 1-6 can optionally be configured such that the second illumination pattern specifies that in response to powering of a specified first LED: the second LEDs, corresponding to first LEDs that are adjacent to the specified first LED, produce second light; and the second LED, corresponding to the specified first LED, does not produce second light.

In Example 8, the illumination system of any one of Examples 1-7 can optionally be configured such that: each first LED includes a first die configured to produce first excitation light; each first LED includes a first amount of a first phosphor configured to absorb at least some of the first excitation light and, in response, produce first phosphor light; each second LED includes a second die configured to produce second excitation light; and each second LED includes a second amount, different from the first amount, of the first phosphor configured to absorb at least some of the second excitation light and, in response, produce second phosphor light.

In Example 9, the illumination system of any one of Examples 1-8 can optionally be configured such that: the first excitation light and the second excitation light have a same wavelength; the first phosphor light and the second phosphor light have a same color point; and different amounts of the first phosphor cause the first light and the second light to have different color points.

In Example 10, the illumination system of any one of Examples 1-9 can optionally be configured such that the illumination system further comprises a controller configured to: receive the specified illumination pattern; receive the specified color point; determine a first set of intensities and a second set of intensities in response to the specified color point, the first set of intensities and the second set of intensities representing relative amounts of light at the first color point and the second color point, respectively; cause the first LED array to be electrically powered, with the first set of intensities, in a first illumination pattern that corresponds to the specified illumination pattern; and cause the second LED array to be electrically powered, with the second set of intensities, in a second illumination pattern that corresponds to the specified illumination pattern.

In Example 11, the illumination system of any one of Examples 1-10 can optionally be configured such that: each first LED includes a first die configured to produce first excitation light; each first LED includes a first phosphor, formed from a first phosphor material, configured to absorb at least some of the first excitation light and, in response, produce first phosphor light; each second LED includes a second die configured to produce second excitation light; and each second LED includes a second phosphor, formed from a second phosphor material different from the first phosphor material, configured to absorb at least some of the second excitation light and, in response, produce second phosphor light.

In Example 12, the illumination system of any one of Examples 1-11 can optionally be configured such that: the first excitation light and the second excitation light have a same wavelength; and the second phosphor material being different from the first phosphor material causes the first phosphor light and the second phosphor light to have different color points.

In Example 13, the illumination system of any one of Examples 1-12 can optionally be configured such that the illumination system further comprises a controller configured to: receive the specified illumination pattern; receive the specified color point; determine a first set of intensities and a second set of intensities in response to the specified color point, the first set of intensities and the second set of intensities representing relative amounts of light at the first color point and the second color point, respectively; cause the first LED array to be electrically powered, with the first set of intensities, in a first illumination pattern that corresponds to the specified illumination pattern; and cause the second LED array to be electrically powered, with the second set of intensities, in a second illumination pattern that corresponds to the specified illumination pattern.

In Example 14, the illumination system of any one of Examples 1-13 can optionally further include: a third LED array including third LEDs that are configured to produce third light, the third light corresponding to a specified illumination pattern and having a third color point different from the first color point and different from the second color point; a third lens configured to project the third light onto the scene as third illumination, the third illumination forming third illumination regions at the scene that correspond to the third LEDs, each third illumination region at least partially overlapping with a corresponding first illumination region at the scene and at least partially overlapping with a corresponding second illumination region at the scene, the third illumination combining with the first illumination and the second illumination at the scene to form the combined illumination that corresponds to the specified illumination pattern.

In Example 15, the illumination system of any one of Examples 1-14 can optionally be configured such that the illumination system further comprises a controller configured to: receive the specified illumination pattern; receive the specified color point; determine a first set of intensities, a second set of intensities, and a third set of intensities in response to the specified color point, the first set of intensities, the second set of intensities, and the third set of intensities representing relative amounts of light at the first color point, the second color point, and the third color point, respectively; cause the first LED array to be electrically powered, with the first set of intensities, in a first illumination pattern that corresponds to the specified illumination pattern; cause the second LED array to be electrically powered, with the second set of intensities, in a second illumination pattern that corresponds to the specified illumination pattern; and cause the third LED array to be electrically powered, with the third set of intensities, in a third illumination pattern that corresponds to the specified illumination pattern.

In Example 16, a method for providing illumination can include: producing, with a first light-emitting diode (LED) array including first LEDs, first light that corresponds to a specified illumination pattern and has a first color point; projecting, with a first lens, the first light onto a scene as first illumination, the first illumination forming first illumination regions at the scene that correspond to the first LEDs; producing, with a second LED array including second LEDs, second light that has a second color point different from the first color point; and projecting, with a second lens, the second light onto the scene as second illumination, the second illumination forming second illumination regions at the scene that correspond to the second LEDs, each second illumination region at least partially overlapping with a corresponding first illumination region at the scene, the first illumination combining with the second illumination at the scene to form combined illumination that corresponds to the specified illumination pattern, the combined illumination having a specified color point between the first color point and the second color point.

In Example 17, the method of Example 16 can optionally be configured such that: each first LED includes a first die configured to produce first excitation light; each first LED includes a first phosphor configured to absorb at least some of the first excitation light and, in response, produce first phosphor light; the first phosphor is further configured to absorb at least some first excitation light from adjacent first LEDs in the first LED array and, in response, produce spurious phosphor light, such that the first light is a combination of at least some of the first excitation light and at least some of the first phosphor light and at least some of the spurious phosphor light; each second LED includes a second die configured to produce second excitation light, the second excitation light and the first excitation light having a same wavelength; each second LED lacks a phosphor, such that the second light includes only the second excitation light; a combination of the first excitation light and the first phosphor light has a specified color point; a combination of the first excitation light and the first phosphor light and the spurious phosphor light has a discolored color point; a combination of the first excitation light and the first phosphor light and the spurious phosphor light and the second light has a color-corrected color point; and a difference between the color-corrected color point and the specified color point is less than a difference between the discolored color point and the specified color point.

In Example 18, the method of any one of Examples 16-17 can optionally be configured such that: each first LED includes a first die configured to produce first excitation light; each first LED includes a first amount of a first phosphor configured to absorb at least some of the first excitation light and, in response, produce first phosphor light; each second LED includes a second die configured to produce second excitation light, the second excitation light and the first excitation light having a same wavelength; each second LED includes a second amount, different from the first amount, of the first phosphor configured to absorb at least some of the second excitation light and, in response, produce second phosphor light, the second phosphor light and the first phosphor light having a same color point; and different amounts of the first phosphor cause the first light and the second light to have different color points.

In Example 19, the method of any one of Examples 16-18 can optionally be configured such that: each first LED includes a first die configured to produce first excitation light; each first LED includes a first phosphor, formed from a first phosphor material, configured to absorb at least some of the first excitation light and, in response, produce first phosphor light; each second LED includes a second die configured to produce second excitation light, the second excitation light and the first excitation light having a same wavelength; each second LED includes a second phosphor, formed from a second phosphor material different from the first phosphor material, configured to absorb at least some of the second excitation light and, in response, produce second phosphor light; and different phosphor materials cause the first phosphor light and the second phosphor light to have different color points.

In Example 20, an illumination system can include: an array of first light-emitting diodes (LEDs), each first LED being configured to emit excitation light when powered, each first LED including a phosphor configured to absorb at least some of the excitation light and, in response, produce phosphor light, a combination of the excitation light and the phosphor light forming specified light that has a specified color point, the phosphor of each first LED further configured to produce spurious phosphor light in response to leaked excitation light from adjacent first LEDs in the array of first LEDs, a combination of the excitation light and the phosphor light and the spurious phosphor light forming discolored light having a discolored color point that differs from the specified color point; at least one lens configured to collimate the discolored light to form discolored illumination and illuminate a scene with the discolored illumination, the first LEDs forming corresponding first illumination regions in the discolored illumination at the scene; and an array of second LEDs having a one-to-one correspondence with the array of first LEDs, the second LEDs being configured to emit color-correction light having a color-correction color point that differs from the specified color point, the at least one lens configured to collimate the color-correction light to form color-correction illumination and illuminate the scene with the color-correction illumination, the second LEDs forming corresponding second illumination regions in the color-correction illumination at the scene, each second illumination region at least partially overlapping with a corresponding first illumination region at the scene, the discolored illumination combining with the color-correction illumination to form corrected illumination at the scene, the corrected illumination having a corrected color point, a difference between the corrected color point and the specified color point being less than a difference between the discolored color point and the specified color point.

In Example 21, an illumination system can include a processor; memory including instructions that, when executed by the processor, cause the processor to perform operations, the operations including: producing, with a first light-emitting diode (LED) array including first LEDs, first light that corresponds to a specified illumination pattern and has a first color point; projecting, with a first lens, the first light onto a scene as first illumination, the first illumination forming first illumination regions at the scene that correspond to the first LEDs; producing, with a second LED array including second LEDs, second light that has a second color point different from the first color point; and projecting, with a second lens, the second light onto the scene as second illumination, the second illumination forming second illumination regions at the scene that correspond to the second LEDs, each second illumination region at least partially overlapping with a corresponding first illumination region at the scene, the first illumination combining with the second illumination at the scene to form combined illumination that corresponds to the specified illumination pattern, the combined illumination having a specified color point between the first color point and the second color point.

In Example 22, the illumination system of Example 21 can optionally include the limitations of any one of Examples 1-20.

In Example 23, an illumination system can include a processor; memory including instructions that, when executed by the processor, cause the processor to perform operations, the operations including: receiving a specified illumination pattern; causing a first LED array to be electrically powered in a first illumination pattern that corresponds to the specified illumination pattern; and causing a second LED array to be electrically powered in a second illumination pattern that at least partially compensates for the spurious phosphor light, such that a combination of the spurious phosphor light and the second light has the specified color point.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An illumination system, comprising:
    a first light-emitting diode (LED) array including first LEDs that are configured to produce first light, the first light corresponding to a specified illumination pattern and having a first color point, each first LED including a first die configured to produce first excitation light, each first LED including a first phosphor configured to absorb at least some of the first excitation light and, in response, produce first phosphor light, the first phosphor being further configured to absorb at least some first excitation light from adjacent first LEDs in the first LED array and, in response, produce spurious phosphor light, such that the first light is a combination of at least some of the first excitation light and at least some of the first phosphor light and at least some of the spurious phosphor light;
    a first lens configured to project the first light onto a scene as first illumination, the first illumination forming first illumination regions at the scene that correspond to the first LEDs;
    a second LED array including second LEDs that are configured to produce second light, the second light having a second color point different from the first color point, each second LED including a second die configured to produce second excitation light, each second LED lacking a phosphor, such that the second light includes only the second excitation light; and
    a second lens configured to project the second light onto the scene as second illumination, the second illumination forming second illumination regions at the scene that correspond to the second LEDs, each second illumination region at least partially overlapping with a corresponding first illumination region at the scene, the first illumination combining with the second illumination at the scene to form combined illumination that corresponds to the specified illumination pattern, the combined illumination having a specified color point between the first color point and the second color point.

2. The illumination system of claim 1, wherein:
    the first lens defines a first central axis extending from the first LED array through a center of the first lens;
    the second lens defines a second central axis extending from the second LED array through a center of the second lens;
    the first central axis is parallel to the second central axis;
    the first LED array is located at a focal plane of the first lens; and
    the second LED array is located at a focal plane of the second lens.

3. The illumination system of claim 1, wherein:
    a combination of the first excitation light and the first phosphor light has the specified color point;
    a combination of the first excitation light and the first phosphor light and the spurious phosphor light has a discolored color point;
    a combination of the first excitation light and the first phosphor light and the spurious phosphor light and the second light has a color-corrected color point; and
    a difference between the color-corrected color point and the specified color point is less than a difference between the discolored color point and the specified color point.

4. The illumination system of claim 1, wherein the first excitation light and the second excitation light have a same wavelength.

5. The illumination system of claim 4, wherein the illumination system further comprises a controller configured to:
    receive the specified illumination pattern;
    cause the first LED array to be electrically powered in a first illumination pattern that corresponds to the specified illumination pattern; and
    cause the second LED array to be electrically powered in a second illumination pattern that at least partially compensates for the spurious phosphor light, such that a combination of the spurious phosphor light and the second light has the specified color point.

6. The illumination system of claim 5, wherein the second illumination pattern specifies that in response to powering of a specified first LED:
    a subset of the second LEDs, corresponding to first LEDs that are adjacent to the specified first LED, produce the second light; and a single second LED of the second LEDs, corresponding to the specified first LED, does not produce the second light.

7. The illumination system of claim 1, wherein:
each first LED includes a first die configured to produce the first excitation light;
each first LED includes a first amount of a first phosphor configured to absorb at least some of the first excitation light and, in response, produce the first phosphor light;
each second LED includes a second die configured to produce the second excitation light; and
each second LED includes a second amount, different from the first amount, of the first phosphor configured to absorb at least some of the second excitation light and, in response, produce second phosphor light.

8. The illumination system of claim 7, wherein:
the first excitation light and the second excitation light have a same wavelength;
the first phosphor light and the second phosphor light have a same color point; and
different amounts of the first phosphor cause the first light and the second light to have different color points.

9. The illumination system of claim 7, wherein the illumination system further comprises a controller configured to:
receive the specified illumination pattern;
receive the specified color point;
determine a first set of intensities and a second set of intensities in response to the specified color point, the first set of intensities and the second set of intensities representing relative amounts of light at the first color point and the second color point, respectively;
cause the first LED array to be electrically powered, with the first set of intensities, in a first illumination pattern that corresponds to the specified illumination pattern; and
cause the second LED array to be electrically powered, with the second set of intensities, in a second illumination pattern that corresponds to the specified illumination pattern.

10. The illumination system of claim 1, wherein:
each first LED includes a first die configured to produce the first excitation light;
each first LED includes a first phosphor, formed from a first phosphor material, configured to absorb at least some of the first excitation light and, in response, produce the first phosphor light;
each second LED includes a second die configured to produce the second excitation light; and
each second LED includes a second phosphor, formed from a second phosphor material different from the first phosphor material, configured to absorb at least some of the second excitation light and, in response, produce second phosphor light.

11. The illumination system of claim 10, wherein:
the first excitation light and the second excitation light have a same wavelength; and
the second phosphor material being different from the first phosphor material causes the first phosphor light and the second phosphor light to have different color points.

12. The illumination system of claim 10, wherein the illumination system further comprises a controller configured to:
receive the specified illumination pattern;
receive the specified color point;
determine a first set of intensities and a second set of intensities in response to the specified color point, the first set of intensities and the second set of intensities representing relative amounts of light at the first color point and the second color point, respectively;
cause the first LED array to be electrically powered, with the first set of intensities, in a first illumination pattern that corresponds to the specified illumination pattern; and
cause the second LED array to be electrically powered, with the second set of intensities, in a second illumination pattern that corresponds to the specified illumination pattern.

13. The illumination system of claim 10, further comprising:
a third LED array including third LEDs that are configured to produce third light, the third light corresponding to the specified illumination pattern and having a third color point different from the first color point and different from the second color point; and
a third lens configured to project the third light onto the scene as third illumination, the third illumination forming third illumination regions at the scene that correspond to the third LEDs, each third illumination region at least partially overlapping with a corresponding first illumination region at the scene and at least partially overlapping with a corresponding second illumination region at the scene, the third illumination combining with the first illumination and the second illumination at the scene to form the combined illumination that corresponds to the specified illumination pattern.

14. The illumination system of claim 13, wherein the illumination system further comprises a controller configured to:
receive the specified illumination pattern;
receive the specified color point;
determine a first set of intensities, a second set of intensities, and a third set of intensities in response to the specified color point, the first set of intensities, the second set of intensities, and the third set of intensities representing relative amounts of light at the first color point, the second color point, and the third color point, respectively;
cause the first LED array to be electrically powered, with the first set of intensities, in a first illumination pattern that corresponds to the specified illumination pattern;
cause the second LED array to be electrically powered, with the second set of intensities, in a second illumination pattern that corresponds to the specified illumination pattern; and
cause the third LED array to be electrically powered, with the third set of intensities, in a third illumination pattern that corresponds to the specified illumination pattern.

15. A method for providing illumination, the method comprising:
producing, with a first light-emitting diode (LED) array including first LEDs, first light that corresponds to a specified illumination pattern and has a first color point, each first LED including a first die configured to produce first excitation light, each first LED including a first phosphor configured to absorb at least some of the first excitation light and, in response, produce first phosphor light, the first phosphor being further configured to absorb at least some first excitation light from adjacent first LEDs in the first LED array and, in response, produce spurious phosphor light, such that the first light is a combination of at least some of the first excitation light and at least some of the first phosphor light and at least some of the spurious phosphor light;
projecting, with a first lens, the first light onto a scene as first illumination, the first illumination forming first illumination regions at the scene that correspond to the first LEDs;
producing, with a second LED array including second LEDs, second light that has a second color point different from the first color point, each second LED including a second die configured to produce second excitation light, each second LED lacking a phosphor, such that the second light includes only the second excitation light; and
projecting, with a second lens, the second light onto the scene as second illumination, the second illumination forming second illumination regions at the scene that correspond to the second LEDs, each second illumination region at least partially overlapping with a corresponding first illumination region at the scene, the first illumination combining with the second illumination at the scene to form combined illumination that corresponds to the specified illumination pattern, the combined illumination having a specified color point between the first color point and the second color point.

16. The method of claim 15, wherein:
the second excitation light and the first excitation light have a same wavelength;
a combination of the first excitation light and the first phosphor light has the specified color point;
a combination of the first excitation light and the first phosphor light and the spurious phosphor light has a discolored color point;
a combination of the first excitation light and the first phosphor light and the spurious phosphor light and the second light has a color-corrected color point; and
a difference between the color-corrected color point and the specified color point is less than a difference between the discolored color point and the specified color point.

17. The method of claim 15, wherein:
each first LED includes a first amount of the first phosphor configured to absorb at least some of the first excitation light and, in response, produce the first phosphor light;
the second excitation light and the first excitation light have a same wavelength;
each second LED includes a second amount, different from the first amount, of the first phosphor configured to absorb at least some of the second excitation light and, in response, produce second phosphor light, the second phosphor light and the first phosphor light having a same color point; and
different amounts of the first phosphor cause the first light and the second light to have different color points.

18. The method of claim 15, wherein:
each first LED includes a first die configured to produce first excitation light;
each first LED includes a first phosphor, formed from a first phosphor material, configured to absorb at least some of the first excitation light and, in response, produce first phosphor light;
each second LED includes a second die configured to produce second excitation light, the second excitation light and the first excitation light having a same wavelength;
each second LED includes a second phosphor, formed from a second phosphor material different from the first phosphor material, configured to absorb at least some of the second excitation light and, in response, produce second phosphor light; and
different phosphor materials cause the first phosphor light and the second phosphor light to have different color points.

19. An illumination system, comprising:
an array of first light-emitting diodes (LEDs),
each first LED being configured to emit excitation light when powered,
each first LED including a phosphor configured to absorb at least some of the excitation light and, in response, produce phosphor light,
a combination of the excitation light and the phosphor light forming specified light that has a specified color point,
the phosphor of each first LED further configured to produce spurious phosphor light in response to leaked excitation light from adjacent first LEDs in the array of first LEDs,
a combination of the excitation light and the phosphor light and the spurious phosphor light forming discolored light having a discolored color point that differs from the specified color point;
at least one lens configured to collimate the discolored light to form discolored illumination and illuminate a scene with the discolored illumination, the first LEDs forming corresponding first illumination regions in the discolored illumination at the scene; and
an array of second LEDs having a one-to-one correspondence with the array of first LEDs,
the second LEDs being configured to emit color-correction light having a color-correction color point that differs from the specified color point,
the at least one lens configured to collimate the color-correction light to form color-correction illumination and illuminate the scene with the color-correction illumination,
the second LEDs forming corresponding second illumination regions in the color-correction illumination at the scene,
each second illumination region at least partially overlapping with a corresponding first illumination region at the scene,
the discolored illumination combining with the color-correction illumination to form corrected illumination at the scene,
the corrected illumination having a corrected color point,
a difference between the corrected color point and the specified color point being less than a difference between the discolored color point and the specified color point.

* * * * *